United States Patent
Kim et al.

(10) Patent No.: US 10,058,215 B2
(45) Date of Patent: Aug. 28, 2018

(54) OIL/WATER TANK DEEP FRYING DEVICE

(71) Applicant: META SCIENCE INC., Seoul (KR)

(72) Inventors: Jin-Woo Kim, Pyeongtaek-si (KR); Seung-Kwon Noh, Seoul (KR)

(73) Assignee: META SCIENCE INC., Seoul (KR)

( * ) Notice: Subject to any disclaimer, the term of this patent is extended or adjusted under 35 U.S.C. 154(b) by 42 days.

(21) Appl. No.: 15/039,300

(22) PCT Filed: Nov. 7, 2014

(86) PCT No.: PCT/KR2014/010665
§ 371 (c)(1),
(2) Date: May 25, 2016

(87) PCT Pub. No.: WO2015/076516
PCT Pub. Date: May 28, 2015

(65) Prior Publication Data
US 2017/0164785 A1    Jun. 15, 2017

(30) Foreign Application Priority Data

Nov. 25, 2013   (KR) .......................... 10-2013-0143889

(51) Int. Cl.
*A47J 37/12*   (2006.01)

(52) U.S. Cl.
CPC ....... *A47J 37/1276* (2013.01); *A47J 37/1247* (2013.01); *A47J 37/1295* (2013.01); *A47J 37/12* (2013.01)

(58) Field of Classification Search
CPC .... A47J 37/12; A47J 37/1209; A47J 37/1242; A47J 37/1247; A47J 37/1257; A47J 37/1261; A47J 37/1276
(Continued)

(56) References Cited

U.S. PATENT DOCUMENTS

| 4,603,622 A | 8/1986 | Beck |
| 5,819,638 A * | 10/1998 | Yokoyama .......... A47J 37/1247 126/376.1 |

(Continued)

FOREIGN PATENT DOCUMENTS

| CN | 2930555 Y | 8/2007 |
| JP | 60-33932 U | 3/1985 |

(Continued)

OTHER PUBLICATIONS

Japanese Office Action dated Mar. 14, 2017 corresponding to Japanese Application No. 2016-535004.

(Continued)

*Primary Examiner* — Reginald L Alexander
(74) *Attorney, Agent, or Firm* — Hauptman Ham, LLP

(57) ABSTRACT

The present invention relates to a device for deep frying food and, more particularly, relates to and discloses an oil/water tank deep frying device capable of safely operating at a wide range of water levels. The present invention provides an oil/water tank deep frying device comprising: an oil/water tank defining a space in which water and deep frying oil are held; cooling pipes formed inside the oil/water tank and consisting of a vertical pipe formed from the bottom surface of the oil/water tank in a vertical direction and a horizontal pipe formed passing through the side surfaces of the oil/water tank and connected to communicate with the vertical pipe; heating means formed above the cooling pipes within the oil/water tank; and a deep fryer basket supported in the oil/water tank and defining a space for holding items to be fried.

20 Claims, 4 Drawing Sheets

(58) Field of Classification Search
USPC .................. 99/403, 407, 410, 411, 412, 413
See application file for complete search history.

(56) References Cited

U.S. PATENT DOCUMENTS

| | | | | |
|---|---|---|---|---|
| 6,101,929 | A * | 8/2000 | Saito .................... | A47J 37/1266 126/391.1 |
| 6,374,821 | B1 * | 4/2002 | Furuhashi ............ | A47J 37/1247 126/376.1 |
| 7,231,918 | B2 * | 6/2007 | Sato .................... | A47J 37/1271 126/291 |
| 8,302,528 | B2 * | 11/2012 | Pawlick ............... | B65D 81/343 219/725 |
| 2014/0302211 | A1 * | 10/2014 | Rose ....................... | A47J 37/12 426/438 |

FOREIGN PATENT DOCUMENTS

| | | | |
|---|---|---|---|
| JP | 61-126930 U | | 8/1986 |
| JP | 5-21833 U | | 3/1993 |
| JP | 07-308260 A | | 11/1995 |
| JP | 08-228938 A | | 9/1996 |
| JP | 3088222 U | | 6/2002 |
| KR | 10-0958180 B1 | | 5/2010 |
| KR | 10-2012-0102315 A | | 9/2012 |
| KR | 10-2013-0025468 A | | 3/2013 |
| WO | WO 96/03910 | * | 2/1996 |
| WO | WO 2011/096830 | * | 8/2011 |

OTHER PUBLICATIONS

International Search Report dated Jan. 21, 2015 corresponding to International Application PCT/KR2014/010665.

Chinese Office Action dated Jan. 29, 2018 in connection with the counterpart Chinese Patent Application No. 201480064316.5.

* cited by examiner

OIL/WATER TANK DEEP FRYING DEVICE

TECHNICAL FIELD

The present invention relates to a device for deep frying food and, more particularly, to an oil/water tank deep frying device capable of safely operating in a wide range of water levels.

BACKGROUND ART

An oil/water tank deep frying device is intended to fry food in oil positioned above water in a tank according to a difference in specific gravity between water and oil. The oil/water tank deep frying device is provided with a cooling pipe formed at the boundary between the oil and water and a heater installed in the region of oil.

For such oil/water tank deep frying device, if the boundary between the oil and water is misaligned with the cooling pipe, the water boils and thus oil is splattered. Accordingly, careful attention should be paid to adjusting the water level.

In the prior art, Korean Patent Application Publication No. 10-2013-0025468 (Publ. Date: Mar. 12, 2013) discloses a heater for frying food using water and oil in pressure.

DISCLOSURE

Technical Problem

It is an aspect of the present invention to provide an oil/water tank deep frying device capable of stably operating in a wide range of position of the boundary between water and oil.

It is another aspect of the present invention to provide an oil/water tank deep frying device capable of preventing debris of fried food from being stuck to a heater.

Technical Solution

In accordance with one aspect of the present invention, an oil/water tank deep frying device includes an oil/water tank defining a space for containing water and frying oil, a cooling pipe provided in the oil/water tank, the cooling pipe including at least one horizontal pipe arranged to penetrate a lateral surface of the oil/water tank, and a vertical pipe vertically arranged on a bottom surface of the oil/water tank and connected to the horizontal pipe to communicate with the horizontal pipe, a heating means arranged at an upper portion of the cooling pipe in the oil/water tank, and a deep fryer basket supported in the oil/water tank and defining a space for holding items to be fried.

Preferably, the horizontal pipe has a cross section having a vertical length greater than a horizontal length.

The cooling pipe may further include an auxiliary horizontal pipe for connecting the at least one horizontal pipe.

Preferably, the auxiliary horizontal pipe has a cross section identical to the cross section of the horizontal pipe.

Preferably, the oil/water tank includes a see-through window for observing a boundary between the water and the frying oil within a region of the horizontal pipe.

Preferably, a bottom surface of the deep fryer basket is formed by a metal plate provided with a plurality of slits. More preferably, a width of each of the slits is between 2 mm and 5 mm.

Advantageous Effects

According to embodiments of the present invention, an oil/water tank deep frying device may be stably used in a wide range of position of the boundary between water and oil and thus may be conveniently operated not only for business use but also for domestic use.

In addition, the oil/water tank deep frying device may prevent food and debris of fried food from being stuck to a heater, and thus it is each to manage the device.

Figure 1:
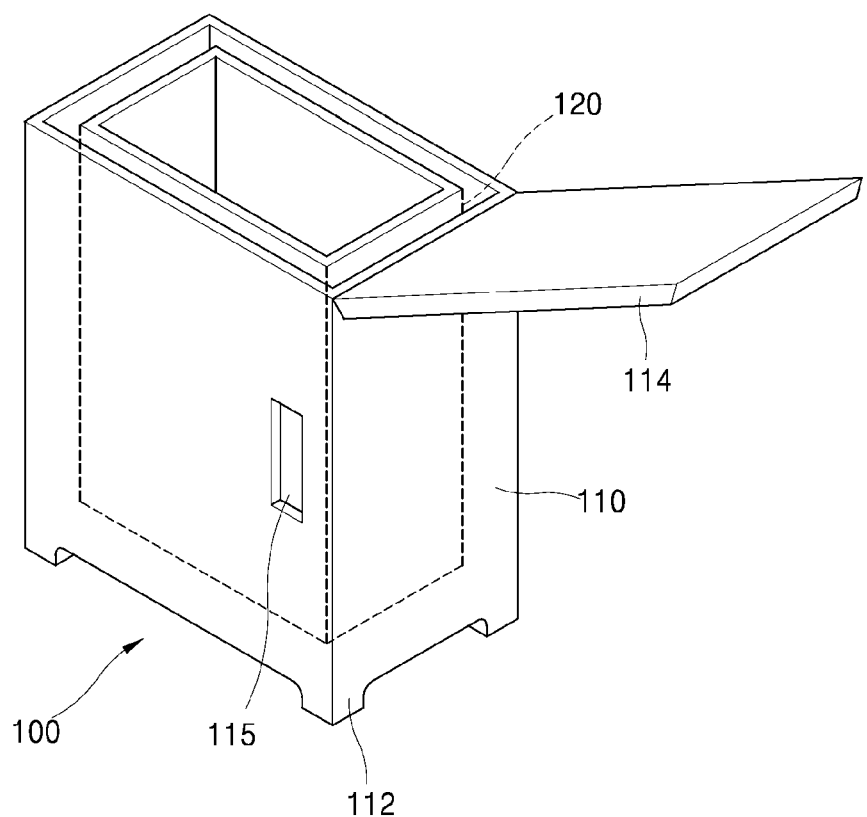
FIG. 1 is a perspective view illustrating the exterior of an oil/water tank deep frying device according to an embodiment of the present invention.

| REFERENCE NUMERALS | | | |
|---|---|---|---|
| 100: | Oil/water tank deep frying device | 110: | Housing |
| 120: | Oil/water tank | 130: | Cooling pipe |
| 132: | Vertical pipe | 134: | Horizontal pipe |
| 136: | Auxiliary horizontal pipe | 140: | Heating means |

BEST MODE

Hereinafter, an oil/water tank deep frying device according to an embodiment of the present invention will be described in detail with reference to the accompanying drawings.

FIG. 1 is a perspective view illustrating the exterior of an oil/water tank deep frying device according to an embodiment of the present invention.

As shown in the figure, an oil/water tank deep frying device 100 includes a housing 110 approximately formed in the shape of a rectangular parallelepiped and an oil/water tank 120 accommodated in the housing 110.

As shown in the figure, the housing 110 has a shape of a hollow container, and is provided with legs 112 such that air can pass through the space between the legs 112. In addition, the oil/water tank 120 is supported in the housing 110 with the bottom surface of the oil/water tank 120 spaced from the installation floor.

The housing 110 has a shape of a container without a bottom plate, and the bottom surface of the oil/water tank 120 defines the outer surface of the bottom side of the housing 110.

A vertical pipe 132 of a cooling pipe, which will be described later, is formed on the bottom surface of the oil/water tank 120. This is intended to introduce external air into the vertical pipe 134 as the bottom surface of the oil/water tank 120 is spaced from the floor.

In addition, the housing 110 is provided with a see-through window 115, and the oil/water tank 120 is provided with a see-through window at a position corresponding to the position of the see-through window 115 of the housing 110.

The see-through window of the oil/water tank 120 is formed to check arrangement of a horizontal pipe 134 of a cooling pipe 130, which will be described later. The see-through window 115 is provided to check the level of the boundary between water and oil in the oil/water tank.

The housing 110 may be provided with an openable lid 140.

Figure 2:
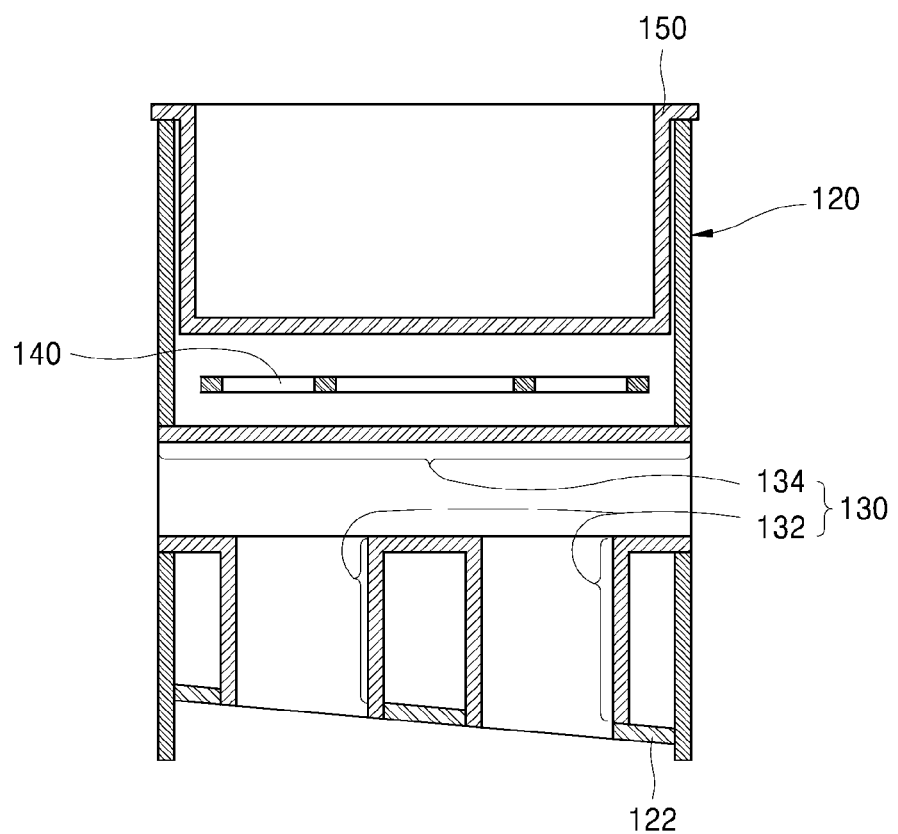
FIG. 2 is a longitudinal cross-sectional view illustrating the oil/water tank deep frying device according to the embodiment of the present invention.

FIG. 2 is a longitudinal cross-sectional view illustrating the oil/water tank deep frying device according to the embodiment of the present invention.

As shown in the figure, the oil/water tank 120 is formed in the shape of a container to define a space for containing water and frying oil.

The bottom surface 122 of the oil/water tank 120 is inclined to one side, and is provided with a drainage pipe (not shown) at the lower side of the inclined surface. The drainage pipe is used to discharge water or frying oil from the oil/water tank.

The cooling pipe 130 is provided in the oil/water tank 120, and a heating means 140 is arranged over the cooling pipe 130.

As the heating means 140, an electric heater such as a PTC heater may be used.

The cooling pipe 130 includes a vertical pipe 132 extending through the bottom surface 122 of the oil/water tank 120 and a horizontal pipe 134 extending through the lateral surface of the oil/water tank 120. The vertical pipe 132 and the horizontal pipe 134 are connected to communicate with each other.

The heating means 140 is disposed over the horizontal pipe 134.

When the tank is filled with water and frying oil such that the boundary between the water and frying oil is positioned at the level of the horizontal pipe 134, the heating means 140 becomes immersed in the frying oil.

When the heating means 140 operates to provide heat to the frying oil, the heated oil moves upward, and the lower portion of the oil is cooled by the water and the cooling pipe 130.

The horizontal pipe 134 should be positioned at the boundary between the water and frying oil to prevent the water from being heated and vaporized by the frying oil.

In conventional cases, the cooling pipe having a circular cross section is disposed in the horizontal direction. Thereby, it is not easy to align the boundary with the cooling pipe.

According to an embodiment of the present invention, the horizontal pipe 134 has a cross section in the shape of a rectangle with the vertical length greater than the horizontal length thereof. Thereby, the range of levels at which the boundary between the water and frying oil can be positioned is extended.

In addition, as the vertical pipe 132 is connected to the horizontal pipe 134, cool air may be smoothly introduced into the vertical pipe 132 from the lower side. Thereby, the cooling effect of the cooling pipe 130 may be enhanced.

According to an embodiment, the oil/water tank deep frying device is provided with a deep fryer basket 150, which is supported in the oil/water tank and defines a space for holding fried items.

The deep fryer basket 150 prevents debris of the fried items from contaminating the interior of the oil/water tank and also prevents the fried items from directly contacting the heating means 140.

Figure 3:
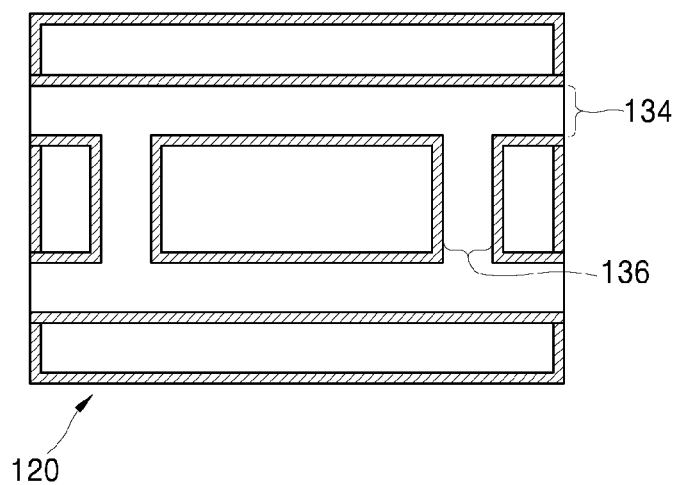
FIG. 3 is a transverse cross-sectional view illustrating the oil/water tank deep frying device according to the embodiment of the present invention.

FIG. 3 is a transverse cross-sectional view illustrating the oil/water tank deep frying device according to the embodiment of the present invention.

The figure shows the oil/water tank deep frying device with the horizontal pipe 134 cut away.

As shown in the figure, the horizontal pipe 134 is arranged to horizontally penetrate the oil/water tank 120, and may further include an auxiliary horizontal pipe 136 for connecting the horizontal pipes 134 to each other.

The auxiliary horizontal pipe 136 is arranged to penetrate the lateral surface of the oil/water tank 120, but is formed to connect the horizontal pipes 134 to each other. The auxiliary horizontal pipe 136 constitutes the cooling pipe 130 together with horizontal pipe 134.

Preferably, the auxiliary horizontal pipe 136 has the same cross-sectional shape as that of the horizontal pipe 134.

Figure 4:
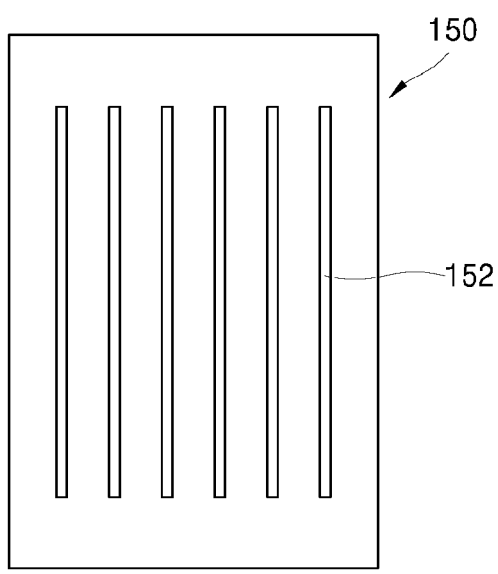
FIG. 4 is a view showing the bottom surface of the oil/water tank deep frying device according to the embodiment of the present invention.

FIG. 4 is a view showing the bottom surface of the oil/water tank deep frying device according to the embodiment of the present invention.

As shown in the figure, the bottom surface of the deep fryer basket 150 may be formed by a metal plate provided with a plurality of slits.

Preferably, the width of each slit is within 2 mm and 5 mm.

If the width of the slit is less than 2 mm, the frying oil may not circulate smoothly. If the width of the slit exceeds 5 mm, the amount of debris of fried items falling into the oil/water tank may undesirably increase.

Typically, a deep fryer basket in the shape of a net is employed. However, for a net-shaped deep fryer basket, flour debris separated from fried items may be stuck in the basket, or flexible frying ingredients may be adsorbed onto the net.

According to the present measure, as the bottom surface in the shape of a plate provided with slits is provided, adhesion of fried items to the basket and contamination of the interior of the oil/water tank by debris may be suppressed.

The embodiments described above should be construed in all aspects as illustrative and not restrictive. The scope of protection sought by the present invention should be determined by the appended claims and their equivalents, and all changes coming within the meaning and equivalency range of the appended claims are intended to be embraced therein.

The invention claimed is:

1. An oil/water tank deep frying device comprising:
   an oil/water tank defining a space for containing water and frying oil;
   a cooling pipe provided in the oil/water tank, the cooling pipe comprising at least one horizontal pipe arranged to penetrate a lateral surface of the oil/water tank; and
   a heating means arranged at an upper portion of the cooling pipe in the oil/water tank, and
   wherein the cooling pipe further comprises at least one vertical pipe vertically arranged on a bottom surface of the oil/water tank and the at least one vertical pipe is vertically connected to the horizontal pipe to communicate with the horizontal pipe.

2. The oil/water tank deep frying device according to claim 1, wherein the horizontal pipe has a cross section having a vertical length greater than a horizontal length.

3. The oil/water tank deep frying device according to claim 2, wherein the cooling pipe further comprises at least one auxiliary horizontal pipe for connecting the at least one horizontal pipe.

4. The oil/water tank deep frying device according to claim 3, wherein the auxiliary horizontal pipe has a cross section identical to the cross section of the horizontal pipe.

5. The oil/water tank deep frying device according to claim 1, wherein the oil/water tank comprises a see-through window for observing a boundary between the water and the frying oil within a region of the horizontal pipe.

6. The oil/water tank deep frying device according to claim 2, further comprising a deep fryer basket supported in the oil/water tank and defining a space for holding items to be fried.

7. The oil/water tank deep frying device according to claim 6, wherein a bottom surface of the deep fryer basket is formed by a metal plate provided with a plurality of slits.

8. The oil/water tank deep frying device according to claim 7, wherein a width of each of the slits is between 2 mm and 5 mm.

9. The oil/water tank deep frying device according to claim 1, further comprising a housing that accommodates the oil/water tank.

10. The oil/water tank deep frying device according to claim 9, wherein the housing comprises two or more of legs on a bottom surface of the housing.

11. The oil/water tank deep frying device according to claim 10, wherein the legs are provided apart from each other, and configured to pass air between the legs.

12. The oil/water tank deep frying device according to claim 1, wherein the bottom surface of the oil/water tank is inclined to one side.

13. The oil/water tank deep frying device according to claim 1, wherein the bottom surface of the oil/water tank has a drain.

14. The oil/water tank deep frying device according to claim 1, wherein the at least one vertical pipe is arranged to penetrate the bottom surface of the oil/water tank.

15. An oil/water tank deep frying device comprising:
an oil/water tank defining a space for containing water and frying oil;
a cooling pipe in the oil/water tank, the cooling pipe comprising at least one horizontal pipe that penetrates a lateral surface of the oil/water tank and at least one auxiliary horizontal pipe communicatively coupled with the at least one horizontal pipe at one or more portions of the at least one horizontal pipe other than end portions of the at least one horizontal pipe that penetrate the lateral surface of the oil/water tank; and
a heater arranged at an upper portion of the cooling pipe in the oil/water tank.

16. The oil/water tank deep frying device according to claim 15, wherein the cooling pipe further comprises a vertical pipe on a bottom surface of the oil/water tank,
wherein the horizontal pipe extends in a first direction and the vertical pipe extends in a second direction different from the first direction, and
the vertical pipe is communicatively coupled with the horizontal pipe.

17. The oil/water tank deep frying device according to claim 15, wherein the horizontal pipe has a cross section having a vertical length greater than a horizontal length.

18. The oil/water tank deep frying device according to claim 15, wherein the auxiliary horizontal pipe has a cross section identical to the cross section of the horizontal pipe.

19. The oil/water tank deep frying device according to claim 15, further comprising a deep fryer basket supported in the oil/water tank and defining a space for holding items to be fried.

20. The oil/water tank deep frying device according to claim 19, wherein a bottom surface of the deep fryer basket is formed by a metal plate provided with a plurality of slits.

* * * * *